United States Patent [19]

Sinfelt

[11] 3,956,190
[45] May 11, 1976

[54] HYDROCARBON CONVERSION CATALYST

[75] Inventor: John Henry Sinfelt, Berkeley Heights, N.J.

[73] Assignee: Exxon Research & Engineering Co., Linden, N.J.

[22] Filed: Dec. 12, 1974

[21] Appl. No.: 531,870

Related U.S. Application Data

[60] Division of Ser. No. 280,253, Aug. 14, 1972, Pat. No. 3,871,996, which is a continuation-in-part of Ser. No. 41,613, May 28, 1970, Pat. No. 3,684,693.

[52] U.S. Cl............................ 252/466 PT; 252/441; 252/472
[51] Int. Cl.².................... B01J 21/04; B01J 23/46
[58] Field of Search.............. 252/466 PT, 441, 472; 208/138, 139

[56] References Cited
UNITED STATES PATENTS

| | | | |
|---|---|---|---|
| 2,854,404 | 9/1958 | Prater et al. | 252/466 PT |
| 3,244,644 | 4/1966 | Stiles | 252/466 PT |

*Primary Examiner*—W. J. Shine
*Attorney, Agent, or Firm*—John W. Ditsler

[57] ABSTRACT

Hydrocarbon materials are converted to useful products by contacting the same at elevated temperatures with a catalyst comprising a refractory support in association with greater than 0.1 wt. % of iridium, osmium, ruthenium or rhodium. The catalyst metal, preferably iridium, is present on the surface of the support in highly dispersed form. The catalyst is particularly effective for promoting naphtha reforming operations.

10 Claims, No Drawings

HYDROCARBON CONVERSION CATALYST

CROSS REFERENCE TO RELATED APPLICATION

This is a division, of application Ser. No. 280,253, filed Aug. 14, 1972, which in turn is a continuation-in-part of application Ser. No. 41,613, filed May 28, 1970, now U.S. Pat. No. 3,684,693.

BACKGROUND OF THE INVENTION

1. Field of the Invention

This invention relates to supported noble metal-containing catalysts and to hydrocarbon conversion processes employing said catalysts. More particularly, this invention relates to improved supported mono-metallic catalysts and their use in hydrocarbon conversion operations, in particular, naphtha reforming processes.

2. Description of the Prior Art

The existence of iridium-containing hydrocarbon conversion catalysts has been reported in the patent literature. Webb et al, in U.S. Pat. No. 2,848,377, disclose that supported iridium/platinum metal combinations are effective hydrocarbon conversion catalysts. Sinfelt et al, in U.S. Pat. No. 3,567,625, teach that combinations of iridium with Group IB metals are effective hydroforming catalysts. Koberstein, in German Pat. No. 1,108,361, teaches that supported platinum catalysts containing minor amounts of iridium can be employed to reform heavy petroleum fractions. Brodbeck, in U.S. Pat. No. 3,538,174, teaches that supported platinum/iridium compositions can be employed in the isomerization of $C_8$ alkyl aromatics. It has been disclosed in U.S. Pat. No. 3,534,110, French Pat. No. 1,567,900 and in Netherlands Pat. No. 70,04770 that cyclohexanol and/or cyclohexanone can be dehydrogenated to phenol and that saturated hydrocarbons can be dehydrogenated to olefins by contact with a supported iridium-containing catalyst that also contains an additional alkali or alkaline earth metal component. Finally, the patentees of U.S. Pat. No. 3,487,009; U.S. Pat. No. 3,507,780; U.S. Pat. No. 3,507,781; U.S. Pat. No. 3,554,902 and U.S. Pat. No. 3,578,583 disclose the existence of various types of supported iridium-containing catalysts and their use in the reforming of naphtha fractions.

SUMMARY OF THE INVENTION

According to the present invention, it has been discovered that certain specific types of supported catalysts containing a single noble metal from the first and second subgroups of Group VIII, designated hereafter as Group $VIII_1$ and $VIII_2$ noble metals, of the Periodic Table, are highly effective for promoting the conversion of hydrocarbon materials to useful products. In particular, an iridium-containing composition is an effective naphtha reforming catalyst.

The catalyst compositions of the present invention consist of a refractory support in association with greater than 0.1 wt. % of one Group $VIII_1$ or $VIII_2$ noble metal, based on total catalyst. Useful catalyst metals include rhodium, ruthenium, osmium and iridium. Iridium is the preferred catalyst metal constituent. The surface area of the metallic fraction of the catalyst is at least 150, preferably greater than 175, and most preferably greater than 200 square meters per gram of said metallic fraction as determined by the carbon monoxide chemisorption method described by Sinfelt and Yates, J. Catalysis, 8, 82 - 90 (1967). Maximum reforming catalyst performance is obtained when the catalyst contains less than about two atoms of sulfur, preferably less than about one atom of sulfur, per atom of catalyst metal, and when the catalyst support material is substantially free of alkali or alkaline earth metal constituents (alkali or alkaline earth metals or compounds thereof). As noted above, the catalysts of the present invention are particularly effective naphtha hydroforming catalysts.

The support or carrier component of the catalysts of the present invention is preferably a porous, adsorptive material having a surface area, as determined by the Brunauer-Emmett-Teller (BET) method, of from about 20 to 800, preferably 100 to 300, square meters/gram. The support material should be substantially refractory at the temperature and pressure conditions utilized in any given hydrocarbon conversion process. Useful support materials include: (a) silicon-based materials such as silica or silica gel, silicon carbide, clays, natural or synthetic silicates such as kieselguhr, kaolin, china clay, Attapulgus clay, etc.; (b) ceramic compositions such as crushed porcelain or fire brick; (c) alumino-silicate zeolite materials such as naturally occurring or synthetic erionite, mordenite, faujasite, etc. that may or may not be previously converted to a hydrogen or ammonia form and reduced in soda content by virtue of an exchange with various metal ions, including rare earth metal cations; (d) refractory inorganic oxides, including alumina, titanium dioxide, zinc oxide, magnesia, thoria, chromia, silica-alumina, alumina-titania, silica-zirconia, alumina-chromia, etc. and (e) mixtures of one or more of the materials referred to above.

Refractory inorganic oxide materials are the preferred catalyst support materials. In general, superior results are obtained when alumina-containing compositions, in particular, the gamma or eta forms, are employed. Alumina is the preferred reforming catalyst support material. The support materials described above are known articles of commerce and can be prepared for use as catalyst constituents by many varied techniques. Typically, the support materials are used in the form of spheres, granules, powders, extrudates or pellets, etc. The precise size or shape of the support material used is dependent upon many engineering factors not within the purview of the instant invention.

A catalyst metal consisting essentially of iridium, ruthenium, rhodium or osmium is present on the surface of the refractory support. During use in a hydrocarbon conversion operation, the catalyst metal is present on the support in a predominantly non-oxide form. Most preferably, the catalyst consists of highly dispersed, supported metal clusters.

Certain minimum amounts of catalyst metal should be present in the catalyst. This is particularly true with respect to catalysts employed in a naphtha reforming operation where the catalyst should contain greater than about 0.1 wt. % of catalyst metal based on the dry weight of the total catalyst. The catalyst metal is normally present in the catalyst in amounts varying from greater than about 0.1 to about 1.0 wt. %, preferably 0.15 to 0.5 wt. %, based upon total weight of the dry catalyst.

As noted earlier, the catalyst metal should be deposited on the refractory support in such a manner that the metal surface area is greater than about 150 and is most preferably at least 200 square meters per gram of metal in the catalyst. Maximum metal surface area can be achieved by taking steps to insure that the catalyst metal, preferably iridium, is not present in a crystalline oxide form immediately prior to reduction. It has been discovered that the effective surface area of the catalyst metal is markedly diminished if it is converted to an oxide form prior to reduction. A simple reduction of crystalline oxides of iridium, ruthenium, rhodium or osmium back to the metal does not serve to disperse the metal in the desired manner. Accordingly, if the catalyst metal is converted to a crystalline oxide form during the course of preparation or use of the catalyst, it is necessary to redisperse the catalyst metal to obtain the desired maximum metal surface area.

The performance of the catalyst system of the present invention is affected by the presence of sulfur or sulfur containing materials arising from the feed stock or other sources. Accordingly, when the catalyst is employed for reforming hydrocarbons, the free and/or combined sulfur content of the catalyst should be maintained at a level less than about two atoms of sulfur, preferably less than one atom of sulfur, per atom of catalyst metal. The desired low catalyst sulfur levels are advantageously maintained during the predominant portion of any reforming cycle. Higher catalyst sulfur levels may be encountered during some portions of a naphtha reforming run such as during startup or in the event of a process upset. Sulfur is removed from the catalyst by contacting the same with sulfur-free feed stock. Finally, the catalyst should be substantially free of alkali metal (Group IA) or alkaline earth metal (Group IIA) constituents (less than 0.1 wt. %), since the presence of basic components on the catalyst serves to inhibit certain reforming reactions.

The catalyst of the present invention can be prepared employing simple impregnation techniques. Specifically, the catalyst is prepared by impregnating the catalyst support material with a solution of a soluble ruthenium, rhodium, osmium or iridium compound. Desirably, an aqueous solution of the metal compound is used. The carrier material is impregnated with an aqueous solution of decomposable compounds of iridium, ruthenium, rhodium or osmium in sufficient concentration to provide the desired quantity of metal in the finished catalyst. Iridium compounds suitable for incorporation onto the carrier include, among others, chloroiridic acid, iridium tribromide, ammonium chloroiridate, iridium trichloride, etc. Ruthenium, rhodium or osmium may be incorporated onto the support material by employing compounds such as ruthenium trichloride, rhodium trichloride, rhodium nitrate, osmium trichloride, chloroosmic acid, etc. The preferred catalyst manufacturing technique involves contacting a previously prepared support, such as alumina, with an aqueous solution of an iridium, ruthenium, rhodium or osmium compound.

Following the impregnation step, the composite catalyst material is dried at a temperature varying from about 220° to 250°F. The catalyst may simply be dried in air at the above stated temperatures or may be dried by treating the catalyst in a flowing stream of inert gas or hydrogen. The drying step may be followed by an additional calcination step at a temperature of about 500° 74 700°F. Care must be taken to avoid contacting the catalyst at temperatures in excess of about 700° – 850°F. with air or other gas of high oxygen concentration. Contacting the catalyst with oxygen at elevated temperature serves to oxidize the catalyst metal to oxide crystallites with simultaneous loss of surface area.

Additional materials may be added to the catalyst combination to promote various types of hydrocarbon conversion reactions. For example, the naphtha reforming activity of the catalyst is improved by the addition of a halogen moiety, particularly a chlorine or fluorine moiety, to the catalyst. The halogen is present in the catalyst in amounts varying from about 0.1 to about 3 wt. %, based on total dry weight of the catalyst. The halogens may be incorporated into the catalyst at any suitable stage in the catalyst manufacture, i.e., before, during, or after incorporation of the catalyst metals onto the support material. Halogen is often incorporated into the catalyst when impregnating the support with a halogen-bearing compound of the desired catalyst metal, such as chloroiridic acid. Further amounts of halogen may be incorporated in the catalyst by contacting it with materials such as hydrogen fluoride, ammonium fluoride, hydrogen chloride, ammonium chloride, either prior to or subsequent to the metal impregnation step. Halogen may also be incorporated by contacting the catalyst with a gaseous stream containing the halogen, generally chlorine.

The catalyst compositions of the present invention have many varied uses. For example, the catalysts can be employed in the formation of aromatic compounds by contacting the catalyst with suitable paraffins or naphthenes at a temperature varying between about 700° and 1000°F. and a pressure of less than about 10 atmospheres in the presence of hydrogen. The catalysts of this invention can also be employed to promote the isomerization of ethylbenzene to xylenes by contacting ethylbenzene with the catalyst at a temperature varying from about 400° to 1100°F. at elevated pressures in the presence of hydrogen. The catalyst is also useful for promoting hydrogenation, hydrocracking, oxidation, polymerization, condensation and other reactions known to the art. However, the catalysts are particularly useful in naphtha reforming processes.

In a naphtha hydroforming (reforming) process, a substantially sulfur-free naphtha stream that typically contains about 20 – 80 volume % paraffins, 20 – 80 volume % naphthenes, and about 5% to 20% aromatics, and boiling at atmospheric pressure substantially between about 80° and 450°F., preferably between about 150° and 375°F., is brought into contact with the catalyst system of the present invention in the presence of hydrogen. The reactions typically take place in the vapor phase at a temperature varying from about 650° to 1000°F., preferably about 750° to 980°F. Reaction zone pressures may vary from about 1 to 50 atmospheres, preferably from about 5 to 25 atmospheres.

The naphtha feedstream is generally passed over the catalyst at space velocities varying from about 0.5 to 20 parts by weight of naphtha per hour per part by weight of catalyst (w/hr./w), preferably from about 1 to 10 w/hr./w. The hydrogen to hydrocarbon mole ratio within the reaction zone is maintained between about 0.5 and 20, preferably between about 1 and 10. During the reforming process, the hydrogen employed can be in admixture with light gaseous hydrocarbons. Since the hydroforming process produces large quantities of hydrogen, a recycle stream is employed for admission of hydrogen with feed.

In a typical operation, the catalyst is maintained as a fixed bed within a series of adiabatically operated reactors. Specifically, the product stream from each reactor (except the last) in the reactor series is reheated prior to passage to the following reactor. As an alternate to the above-described process sequence, the catalyst may be employed in a moving bed in which the naphtha charge stock, hydrogen and catalyst are passed in parallel through the reactor, or in a fluidized system wherein the naphtha feed stock is passed upwardly through a turbulent bed of finely divided catalyst. Finally, if desired, the catalyst may be simply slurried with the charge stock and the resulting mixture conveyed to the reaction zone for further reaction.

A naphtha reforming operation involves a plurality or reactions that occur simultaneously. Specifically, the naphthene portion of the naphtha stream is dehydrogenated to the corresponding aromatic compounds, the normal paraffins are isomerized to branched chain paraffins, and various aromatic compounds are isomerized to other aromatics. The high boiling components in the naphtha stream are also hydrocracked to lower boiling components. The iridium-containing catalyst of this invention has been found to be a particularly effective dehydrocyclization catalyst, that is, an effective catalyst for the conversion of paraffins to aromatics. Accordingly, the catalysts of the present invention, in particular the iridium-containing catalyst, can be used very effectively in the final reactors of a reactor series to promote the conversion of paraffins to aromatics, after the naphthenes contained in the naphtha streams have been converted to aromatics with the use of a conventional reforming catalyst, such as platinum on alumina. The concept is disclosed in Ser. No. 41,613, filed May 28, 1970, now U.S. Pat. No. 3,684,693, the disclosure of which is herein incorporated by reference.

An outstanding feature of the instant iridium containing reforming catalyst is its ability to maintain its catalytic activity at commercially desirable levels for protracted periods of time. In a typical commercial semi-regenerative naphtha reforming process, reaction temperature is increased during the course of the run to maintain constant product octane level. Raising the reaction temperature is necessitated because the catalyst is continuously deactivated due to coke deposition and other factors. Unfortunately, the reaction temperature cannot be raised much beyond about 1000°F. before rapid catalyst deactivation commences. Therefore, as the reaction temperature approaches about 1000°F., it is necessary to regenerate or replace the catalyst. Typically, a regeneration operation consists of burning the coke deposits from the catalyst and thereafter treating the catalyst with a chlorine-containing or providing gas in the presence or absence of oxygen or other materials, e.g., steam, nitrogen, hydrogen sulfide, hydrogen chloride, flue gas, etc.

It is desirable to increase the duration of the periods between process start-up and catalyst regeneration and/or between catalyst regenerations since valuable production time is lost when the catalyst is being regenerated. As noted above, the present iridium-containing catalyst of this invention has good activity maintenance characteristics and, accordingly, needs to be regenerated very infrequently. The specific iridium-containing catalyst of this invention can be used to promote a semi-regenerative naphtha reforming operation conducted at conditions described above to obtain onstream cycle lengths corresponding to the processing of at least about 50 barrels (42 gallons of 231 cubic inches measured at 60°F. per barrel) of naphtha feed stock per pound of catalyst to form $C_{5+}$ reformate product having a research clear octane number of at least 100 without incurring a $C_{5+}$ reformate yield loss greater than about 3 volume % for the last 95% of the reforming cycle (period between start-up and catalyst regeneration), the cycle beginning with either a fresh or freshly regenerated catalyst.

DESCRIPTION OF THE PREFERRED EMBODIMENTS

Example 1

In this example a naphtha feed stream is treated by a standard, commercial catalytic reforming technique. The feed is a mixed Louisiana naphtha boiling in the range of 200° to 325°F. The constituents of the feed stream are as follows: 40% naphthenes, 45% paraffins, 15% aromatics (by weight). It is passed through a series of four catalytic reforming reactors. In each reactor there is a catalyst which comprises 0.6 wt. % of platinum on alumina, prepared by impregnation of alumina with chloroplatinic acid, followed by drying and calcination in air at 1000°F. This is a conventional method of preparation of a platinum reforming catalyst. The catalyst is charged to the reactors in the form of ⅛ inch cylindrical pellets. The surface area of the alumina support used in the catalyst is about 175 $m^2/gm$. The weight hourly space velocity of the feed is 2 pounds per hour per pound of catalyst. Inlet reactor temperatures are maintained at 940°F., average pressure is 300 psig. Hydrogen recycle is about 5000 standard cubic feet per barrel of naphtha feed. After passing through the four catalytic reforming reactors, a liquid product is obtained which has a research clear octane number of about 99.

Example 2

In this example the same feed stream is catalytically reformed under identical processing conditions. There is, however, one significant difference; the platinum-on-alumina catalyst in the third and fourth reactors is replaced by an iridium on alumina catalyst. The catalyst comprises about 0.5 wt. % iridium, about 0.5% chlorine, and the remainder alumina. The catalyst is prepared by impregnation of alumina with an aqueous solution of chloroiridic acid, followed by drying and calcination in air at 500°F. The catalyst is used in the form of ⅛ inch cylindrical pellets.

The feed stream after passing over the platinum-on-alumina catalyst in the first two reactors has the following composition: 5 wt. % naphthenes, 55 wt. % aromatics and 40 wt. % paraffins. After passing through the third and fourth reactors which contain the supported iridium catalyst, the liquid product recovered has a research clear octane number of 103 or higher.

When comparing the octane rating of the product obtained from the process of Example 2 with that of Example 1, a difference of at least 4 octane numbers is noted. This difference is attributable to the improved ability of the iridium catalyst for catalyzing the reactions responsible for octane number improvement beyond the point where the naphthenes have been essentially completely converted to aromatics.

Example 3

A catalyst containing 1.0 wt. % iridium on silica was prepared by impregnating silica with an aqueous solution of chloroiridic acid ($H_2IrCl_6$). The solution contained 0.00455 gm. of iridium (as $H_2IrCl_6$) per milliliter of solution. The amount of impregnating solution used was 2.2 milliliters per gram of silica. The surface area of the silica was approximately 300 m²/gm. as determined by the BET Method. After impregnation of the silica with chloroiridic acid, the resultant material was dried at 230°F.

This catalyst was tested for the reforming of n-heptane. A catalyst charge of 0.5 gram in the form of 10 – 20 mesh granules, diluted with inert 10 – 20 mesh Vycor chips to a volume of 9 milliliters, was employed in the test. An electrically heated steel tubular reactor approximately 0.5 inch in diameter was used. The catalyst was reduced in place in the reactor in downflowing hydrogen for 2 hours at 950°F. prior to the reforming run. The n-heptane (passed downflow) weight hourly space velocity (grams of n-heptane feed per hour per gram of catalyst) was 50, and the hydrogen to n-heptane mole ratio was 5/1. The reaction temperature and pressure were maintained at about 855°F. and 200 psig., respectively. After approximately 1 hour on stream at these conditions, subsequent to 2⅔ hours on stream at temperatures varying from 695° to 880°F., the n-heptane conversion was 55.3% and the selectivity to aromatics was 21.0% (20.3 % toluene + 0.7% benzene).

Example 4

The catalyst of Example 3 was calcined in air for 2 hours at 900°F. and then tested for n-heptane reforming at the conditions of Example 3, except that a lower weight hourly space velocity of 20 was used. After 1 hour on stream at this space velocity and at a temperature of 855°F., subsequent to 3 hours on stream at temperatures ranging from 850° to 907°F. and 2 hours on hydrogen at 850°F., the n-heptane conversion was 35.2% and the selectivity to aromatics was 14.3% (13.6% toluene and 0.7% benzene). Clearly, the 1% iridium on silica catalyst after calcination in air at 900°F. is much less active and also less selective to aromatics, than the 1% iridium on silica catalyst of Example 3, which was not calcined in air.

Example 5

A catalyst containing 0.5 wt. % iridium on alumina was prepared by impregnating alumina with an aqueous solution of chloroiridic acid ($H_2IrCl_6$). The solution contained 0.0077 gm. of iridium (as $H_2IrCl_6$) per milliliter of solution. The amount of impregnating solution used was 0.65 milliliter per gram of alumina. The alumina was prepared by heating beta alumina trihydrate for 24 hours at 1600°F. The surface area of the alumina was approximately 80 m²/gm. as determined by the BET Method. After the impregnation step, the resulting material was dried at 230°F.

This catalyst was tested for the reforming of a 200° – 325°F. boiling range mixed Louisiana naphtha in an electrically heated steel tubular reactor approximately 0.5 inch in diameter. A catalyst charge of 3.0 grams in the form of 10 – 20 mesh granules, diluted to a volume of 9 milliliters with inert ceramic granules of similar mesh size, was reduced for 2 hours in hydrogen at 950°F. in place in the reactor prior to the run. The reforming conditions were 200 psig., 940°F., and a hydrogen to hydrocarbon mole ratio of 5/1. The weight hourly space velocity of naphtha was 6. The research clear octane number of the liquid reformate product obtained during the first five hours on stream was 103 to 105.

Example 6

A 1% iridium on alumina catalyst was prepared by impregnating alumina with an aqueous solution of chloroiridic acid. The solution contained 0.1 gm. of iridium (as $H_2IrCl_6$) per milliliter of solution. The amount of impregnating solution used was 0.10 milliliter per gram of alumina. After the impregnation step, the resulting material was dried in air for 16 hours at 230°F. After reduction of the catalyst in hydrogen at 932°F., followed by evacuation at 932°F. and subsequent cooling to room temperature, a carbon monoxide adsorption measurement of iridium surface area was made, utilizing the method described by Sinfelt and Yates, J: Catalysis, 8, 82 – 90 (1967). The iridium surface area was approximately 180 m²/gm., from which the iridium crystallite size was estimated to be about 15A (calculated as diameter of spherical crystallite or edge of cubic crystallite). After the adsorption run, the catalyst was heated in oxygen at a pressure of 5 cm. Hg. at 932°F. for 2 hours. The catalyst was then re-reduced in hydrogen at 932°F., evacuated, and again cooled to room temperature for a carbon monoxide adsorption measurement. The iridium surface area was about 50 m²/gm., and the iridium crystallite size was estimated to be about 50 A. Clearly, the oxygen treatment agglomerated the iridium.

What is claimed is:

1. A naphtha reforming catalyst consisting essentially of a refractory support in association with greater than 0.1 wt. % based on total catalyst, of a single catalyst metal selected from the group consisting of iridium, ruthenium and osmium, the surface area of said catalyst metal on said support being at least 150 square meters per gram of catalyst metal as determined by carbon monoxide chemisorption techniques, said catalyst being prepared by a procedure comprising:
    a. contacting said support with a solution of a decomposable compound of said catalyst metal,
    b. drying said metal-containing support,
    c. calcining said metal-containing support at conditions that inhibit the formation of crystalline metal oxides, and
    d. reducing said catalyst metal compound to the catalyst metal, said catalyst metal not being present on said support in a crystalline oxide form immediately prior to said reduction.

2. The catalyst of claim 1 wherein said catalyst contains less than about two atoms of sulfur per atom of catalyst metal and is substantially free of alkali and alkaline earth metal constituents.

3. The catalyst of claim 1 wherein said catalyst metal is iridium.

4. The catalyst of claim 1 wherein said catalyst additionally contains a halogen moiety in an amount from 0.1 to 3 wt. % based on total catalyst.

5. The catalyst of claim 4 wherein said halogen moiety is a chlorine moiety, a fluorine moiety, or mixtures thereof.

6. The catalyst of claim 1 wherein said refractory support is alumina.

7. A hydrocarbon conversion catalyst consisting essentially of a refractory support in association with greater than 0.1 wt. % of iridium based on total catalyst, the surface area of said iridium on said support being at least 200 square meters per gram of said iridium as determined by carbon monoxide chemisorption techniques, said catalyst containing a halogen moiety in an amount from 0.1 to 3 wt. %, based on total catalyst, and containing less than about two atoms of sulfur per atom of iridium and being substantially free of alkali and alkaline earth metal constituents, said catalyst being prepared by a procedure comprising:
 a. contacting said support with a solution of a decomposable compound of said catalyst metal,
 b. drying said metal-containing support,
 c. calcining said metal-containing support at conditions that inhibit the formation of crystalline metal oxides, and
 d. reducing said catalyst metal compound to the catalyst metal, said catalyst metal not being present on said support in a crystalline oxide form immediately prior to said reduction.

8. The catalyst of claim 7 wherein said support is a refractory inorganic oxide.

9. The catalyst of claim 7 wherein said halogen moiety is a chlorine moiety.

10. The catalyst of claim 9 wherein said support is alumina.

* * * * *